US009198447B2

(12) United States Patent
Kruiver

(10) Patent No.: US 9,198,447 B2
(45) Date of Patent: Dec. 1, 2015

(54) DEVICE AND PROCESS FOR CONCHING EDIBLE MASS

(71) Applicant: ROYAL DUYVIS WIENER B.V., Koog aan de Zaan (NL)

(72) Inventor: Jan Kruiver, Zaandam (NL)

(73) Assignee: Royal Duyvis Wiener B.V., Koog Aan de Zaan (NL)

( * ) Notice: Subject to any disclaimer, the term of this patent is extended or adjusted under 35 U.S.C. 154(b) by 0 days.

(21) Appl. No.: 14/373,917

(22) PCT Filed: Jan. 25, 2013

(86) PCT No.: PCT/EP2013/051513
§ 371 (c)(1),
(2) Date: Jul. 23, 2014

(87) PCT Pub. No.: WO2013/110795
PCT Pub. Date: Aug. 1, 2013

(65) Prior Publication Data
US 2015/0118374 A1      Apr. 30, 2015

(30) Foreign Application Priority Data

Jan. 27, 2012   (EP) .................................... 12152901

(51) Int. Cl.
*A23G 1/12*      (2006.01)
*A23G 1/00*      (2006.01)

(52) U.S. Cl.
CPC .............. *A23G 1/125* (2013.01); *A23G 1/0036* (2013.01)

(58) Field of Classification Search
CPC .......................... A23G 1/0036; A23G 1/125
See application file for complete search history.

(56) References Cited

U.S. PATENT DOCUMENTS

| 2,348,473 A | 5/1944 | Hollstein |
| 3,236,687 A * | 2/1966 | Petzold et al. .................. 127/38 |
| 6,280,076 B1 | 8/2001 | Muntener |

FOREIGN PATENT DOCUMENTS

| EP | 0294876 A1 | 12/1988 |
| EP | 0574764 A2 | 12/1993 |
| EP | 0799574 A2 | 10/1997 |
| GB | 1251044 A | 10/1971 |

OTHER PUBLICATIONS

International Preliminary Report on Patentability; Mailed Mar. 4, 2014 related PCT Application No. PCT/EP2013/051513.
Chinese Office Action; mailed Sep. 15, 2015 for CN Application No. CN201380010291.6.

* cited by examiner

*Primary Examiner* — Anthony Weier
(74) *Attorney, Agent, or Firm* — Mendelsohn, Drucker and Dunleavy, P.C.

(57) ABSTRACT

The invention relates to a system (1) for conching edible mass, in particular cocoa containing mass, such as chocolate, cocoa liquor or compound, including a shear device, in particular a so-called taste-changer (14), in turn has a housing (16), a shaft (17) rotatably mounted in the housing (16), means (19, 20) for subjecting the edible mass to high shear stresses, means (21, 22) for spreading the edible mass after it has been subjected to high shear, and an inlet (24, 25) for supplying a gas to the spread edible mass. The system further includes a thin film evaporator (15) to treat the edible mass exiting the shear device (14).

26 Claims, 2 Drawing Sheets

DEVICE AND PROCESS FOR CONCHING EDIBLE MASS

The invention relates to a system for conching edible mass, in particular cocoa containing mass, such as chocolate, cocoa liquor or compound, comprising a shear device, in particular a so-called TASTE-CHANGER™ conching machine, in turn comprising a housing, a shaft rotatably mounted in the housing, means for subjecting the edible mass to high shear stresses, means for spreading the edible mass after it has been subjected to high shear, and an inlet for supplying a gas, typically hot air, to the spread edible mass to extract volatile components, such as organic acids, from the edible mass. The invention further relates to a process for conching edible mass.

As explained in U.S. Pat. No. 2,348,473, for many years chocolate in a semi-plastic, semi-liquid state has been given what is commonly known as a conching treatment for the generally accepted purposes of, inter alia, improving its flavor and reducing its moisture content. According to U.S. Pat. No. 2,348,473, "The term conching . . . first came to be used in connection with the treatment of chocolate in vat-type machines which were curved at each end and in which heavy rollers, usually of stone, were pushed back and forth on the floor of the vat. The rollers produced a wave of material which fell over at each end upon the surface of the body of chocolate with a resounding slap. This wave splash gave an aerating and disintegrating action and the action of the roller on the bottom of the vat produced a disintegrating or grinding action."

Other types of conching devices have been developed since.

European patent application 294 876 relates to a device for refining chocolate mass, consisting of a housing (denoted by numeral 1 in the Figures of EP 294 876), means (2,3) for spreading the chocolate mass out in a film consisting of a rotary driven disc (3) and means (10,11) for supplying air to the spread chocolate mass. In addition, the device comprises means (2,8,9) for subjecting said chocolate mass, prior to it being spread out, to high shear stresses, which means (2,8,9) are formed by radially directed pins (9) on the drive shaft (2) of said rotary driven disc (3) and rings (8) directed radially to said drive shaft (2) and arranged in a housing (1) disposed concentrically to said drive shaft (2).

The device according to EP 294 876 is available under the name Taste-Changer™. The Taste-Changer™ is an alternative to traditional conching machines, i.e. it provides aeration resulting in removal of volatile organic acids and in dehydration as well as agitation of the mass processed. As mentioned, it combines a means for generating shear stresses, which means comprises radial pins on a vertical rotary shaft and an evaporator disc. Hot, dry air and chocolate or chocolate liquor are intensively brought into contact with one another, causing moisture, volatile organic acids and off-flavours to be extracted from the mixture. The shear stress device reduces the viscosity of the mixture, thereby increasing the efficiency of the evaporator disc.

EP 0 799 574 relates to a treatment method, wherein cocoa mass is continuously refined. The mass undergoes both thermal and de-aeration treatments in a thin film reactor. A feature is the raising to sterilisation temperature exclusively through externally supplied heat, transferred through the wall of the sterilisation unit. The mass is scraped off the inner surfaces of the heated wall continuously, using a slowly moving scraper. It is blended slowly, transversely with respect to the long axis of the casing. Following discharge and depressurisation, the cocoa mass is transferred to thin film refinement.

Another well-known method of conching chocolate involves a roller refiner and a (downstream) traditional conch. This method yields chocolate having a good sensory profile, defined by a plurality of parameters, such as melting behaviour, sweetness, acidity, bitterness, creaminess, cocoa taste, and balance. However, this method typically requires long residence times (up to 48 hours for dark chocolate) and high energy input.

It is an object of the present invention to provide a system for and a method of treating edible mass, in particular cocoa containing mass, such as chocolate, cocoa liquor or compound, which at relatively short residence times and relatively low energy consumption, yield a product, e.g. chocolate, having one or more improved sensory parameters, e.g. improved creaminess, and/or relatively low viscosity and/or a relatively good yield value.

To this end, the device according to the present invention is characterized by a thin film evaporator to further treat the edible mass exiting the shear device.

The combination of a shear device, in particular a TASTE-CHANGER™ conching machine, and a thin film evaporator was found to enable relatively short residence times and relatively low energy consumption and yield products, in particular chocolates, having improved creaminess and/or relatively low viscosity.

In an embodiment, the shear device and the thin film evaporator are integrated in the same device, preferably with the shear device positioned above preferably on top of the thin film evaporator. This enables a compact design and direct fluid communication between the outlet of the TASTE-CHANGER™ conching machine and the inlet of the thin film evaporator.

In another embodiment, the system comprises a humidifier upstream from the gas inlet of the shear device. Humidifying the gas was found to result in a lower viscosity of the edible mass in the shear device, further enhancing spreading of the edible mass and evaporation of volatile components.

In a particularly effective shear device, the means for subjecting the edible mass to high shear stresses comprises at least one rotor, preferably mounted on or forming part of a rotary shaft, and at least one corresponding stator. The at least one stator extends, in axial direction, above and/or beneath the rotor and the clearance between the rotor and the stator is preferably less than 6 mm, preferably less than 4 mm, preferably less than 3 mm. In an embodiment, the velocity of the outer circumference of the rotor, e.g. the ends of the pins forming the rotor, is at least 8 m/s, preferably at least 12 m/s, relative to the stator.

In another embodiment, the thin film evaporator comprises a rotationally symmetrical, e.g. substantially cylindrical or conical, inner wall for conveying a film of edible mass, means for heating the inner wall and thus the film, and a plurality of nozzles for directing a (further) gas, also typically hot air, towards the inner wall and mounted, preferably rotatably, within the confines of this wall.

In a further embodiment, the evaporator comprises a drum mounted rotatably within the confines of the inner wall and provided with openings, e.g. rows or helices of holes or slits, forming the nozzles. Such an arrangement facilitates relatively straightforward manufacturing and relatively effective extraction of volatile components and moisture from the edible mass.

In another embodiment, the thin film evaporator is oriented vertically.

To further facilitate compact design and uniform distribution of the edible mass exiting the TASTE-CHANGER™ conching machine and entering the thin film evaporator, in an embodiment, the central driving shafts of the TASTE-CHANGER™ conching machine and the thin film evaporator are co-axial.

In another embodiment, the system comprises a ball mill upstream from the TASTE-CHANGER™ conching machine.

The invention also relates to a process for conching edible mass comprising the steps of
subjecting the edible mass to high shear stresses,
spreading the edible mass to form a film and/or mist,
supplying a gas, typically hot air, to the spread edible mass
and subsequently feeding the edible mass to a thin film evaporator.

In an embodiment, the gas is humified, preferably to at least 80% relative humidity at 20° C., before supplying it to the spread edible mass.

In a further embodiment, the edible mass flows substantially vertically through the thin film evaporator.

In another embodiment, a gas is supplied to the thin film evaporator and the edible mass and the gas flow in opposite directions (counter-current).

Within the framework of the present invention, the term "thin film evaporator" includes wiped film and rolled film evaporators as well as falling film evaporators.

The device according to the present invention can also be used to process other flowable substances, e.g. to reduce viscosity and/or extract volatile components. Examples include vegetable oils and pastes, e.g. sesame paste.

The invention will now be explained in more detail with reference to the figures, which schematically show an embodiment according to the present invention.

Figure 1:
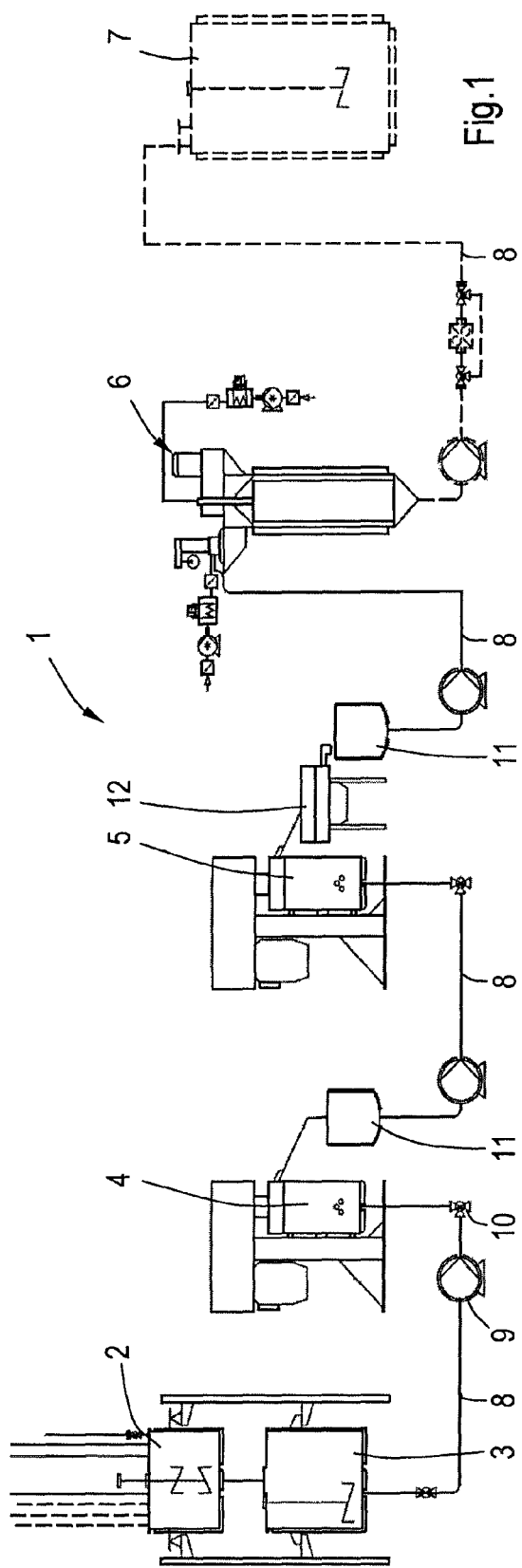
FIG. 1 is a flow diagram of a chocolate plant.

FIG. 1 shows a chocolate plant 1 comprising a weighing device 2 for preparing a recipe from various ingredients of chocolate, a mixer 3, two vertical ball mills 4, 5, the first (upstream) mill 4 having larger diameter grinding elements than the second (downstream) mill 5, a conching unit 6, and optionally a stirred storage tank 7, with generally known conduits 8, pumps 9 and valves 10 operatively connecting these devices 2-7. The ball mills 4, 5, are provided with a downstream buffer tank 11 and optionally a sieve 12.

Figure 2:
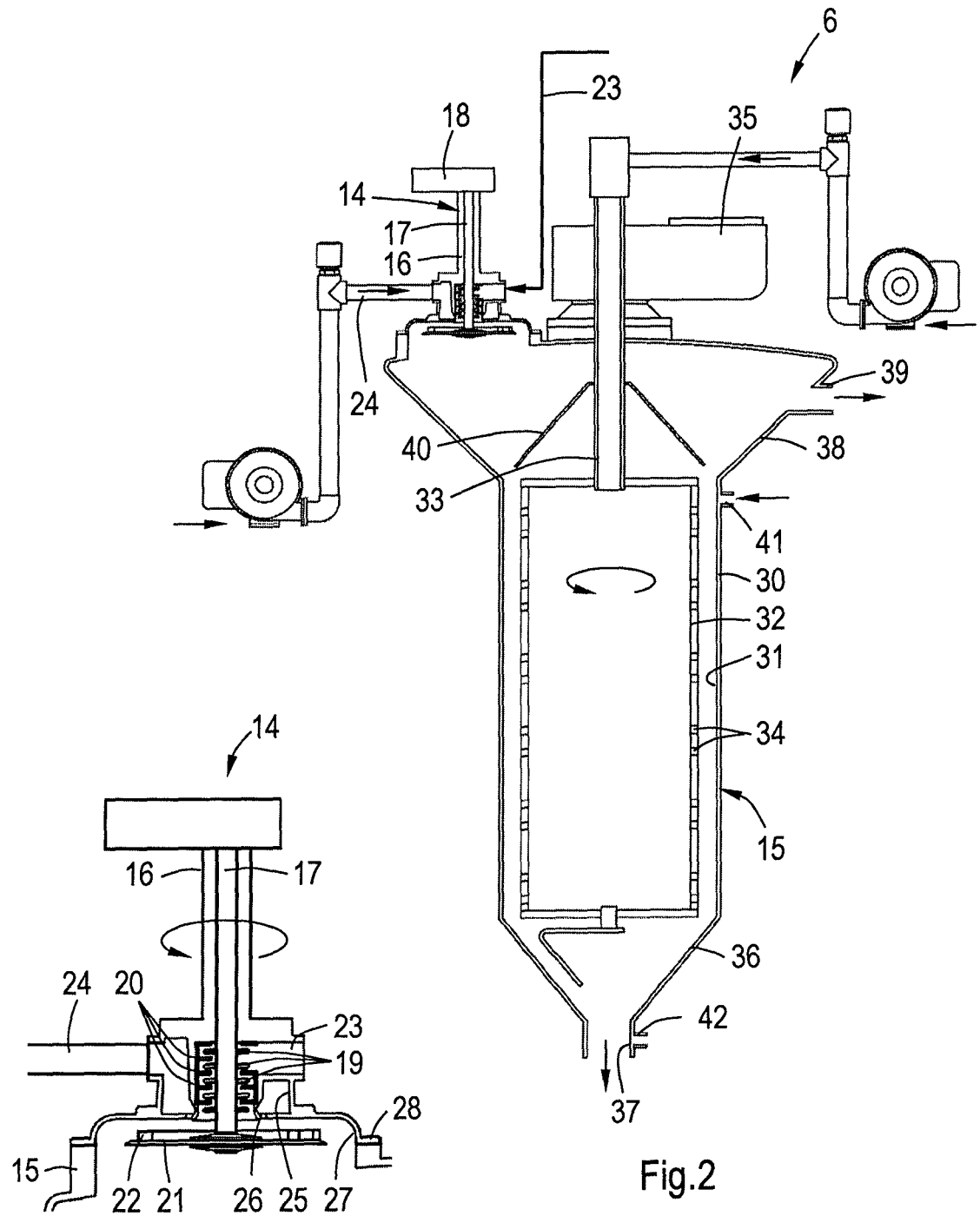
FIG. 2 is a cross-section of a combined TASTE-CHANGER™ conching machine and thin film evaporator according to the present invention.

The conching unit 6 is shown in more detail in FIG. 2 and comprises a TASTE-CHANGER™ conching machine 14 mounted on top of a thin film evaporator 15.

The TASTE-CHANGER™ conching machine 14 in turn comprises a housing 16, a central shaft 17 rotatably mounted in the housing 16, and an electric motor 18 mounted on top of the housing 16 for driving the shaft 17. A plurality of, i.c. five, rotors 19 (depicted in the insert in FIG. 2) are mounted on, e.g. keyed to the shaft 17 and a plurality of, i.c. four, stators 20 are inserted in and bolted to the housing 16, alternating with the rotors 19. The rotors comprise e.g. four spokes, whereas the stators comprise openings corresponding in number and shape to the spokes of the rotors. Preferably, the spacing between the rotors and the stators is in a range from 0.5 to 6 mm, e.g. 2 mm. A disc 21 comprising vanes 22 for spreading and accelerating chocolate mass is fastened to the lower end of the shaft 17.

It is generally preferred that rotors and stators are removably mounted respectively on the shaft and inside the housing, thus facilitating assembly and maintenance of the TASTE-CHANGER™ conching machine and enabling the TASTE-CHANGER™ conching machine to be adapted to different recipes, if required.

The TASTE-CHANGER™ conching machine 15 further comprises a first inlet 23 for supplying chocolate mass to the rotors 5 (shear zone), a second inlet 24 and an annular distribution channel 25 and nozzles 26 for supplying a gas, typically hot air, to the chocolate mass on the disc 21. The underside of the housing 16 is open, forming a wide outlet 27, and comprises a flange 28 with which the TASTE-CHANGER™ conching machine 1 is mounted on, e.g. bolted to, the top of the thin film evaporator 15.

Additional suitable embodiments of the electric motor, shaft, inlets, disc, outlet, and flange are known from existing TASTE-CHANGER™ conching machines and from the TASTE-CHANGER™ conching machines described in EP 294 876 and GB 1 251 044.

The thin film evaporator 15 comprises a vertical, cylindrical, and double walled vessel 30, providing a heatable inner wall 31 for conveying chocolate mass, and a drum 32 mounted on a hollow central shaft 33 within the confines of the inner wall. The drum is provided with one or more strips (not shown) extending over the height of the drum and serving as wipers for forming a thin film, e.g. having a thickness in a range from 0.5 to 1.5 mm, of chocolate mass over the inner wall of the vessel. Further, the drum is provided with rows or helices of holes 34 or slits forming nozzles. In an alternative embodiment (not shown), the nozzles are defined in or attached to the wipers, preferably at a short distance, e.g. in a range from 1 to 10 mm, from the outer edge of the wipers. In such an embodiment, a smaller drum or duct suffices.

In general, it is preferred that the nozzles extend at an inclination relative to the radii of the drum, such that gas is jetted from the nozzles in a direction having has both a radial and a tangential component. This arrangement facilitates an even distribution of chocolate mass over the inner wall of the thin film evaporator and improves extraction of volatile components and moisture from the thin film.

The central shaft 33 is rotatably mounted in the vessel and connected to an electric motor 35 mounted on top of the evaporator 15. The evaporator further comprises a bottom funnel 36 provided with an outlet 37 for chocolate mass as well as a top funnel 38 carrying the TASTE-CHANGER™ conching machine 14 and provided with an outlet 39 for the (stripping) gas, as will be explained in more detail below. A conical baffle 40 is fixed to the shaft 33, such that the baffle and the top funnel together form an annular inlet for the cylindrical vessel 30.

In general, it is preferred that the double wall extends at least from an axial position (height) corresponding to the top of the drum all the way to the bottom of the drum. In this example, the double wall extends also over the funnel and outlet for chocolate mass. The double wall comprises in- and outlets 41, 42 for circulating a heating medium, e.g. water or oil.

During operation, ingredients, such as cocoa mass (also referred to as liquor), cocoa butter, sugar, milk powder, lecithin and/or vanalin, typically having a total fat content of e.g. at least 26 wt %, typically at least 30 wt % are weighed and fed to the mixer. When the ingredients have been properly mixed, the mixture is pumped to the first ball mill and subsequently to the second ball mill thus grinding the mass to a desired particle size distribution.

In an embodiment, the mixture is subsequently fed to the TASTE-CHANGER™ conching machine, which is operated at a rotational speed typically in a range from 1000 to 16000 rpm, depending on at least the size of the TASTE-CHANGER™ conching machine, in particular the diameter of the rotors. In another embodiment the circumferential speed of the disc is in a range from 30 to 90 m/s, preferably in a range from 50 to 70 m/s.

Further, air having a temperature of e.g. 20° C. is withdrawn from the surroundings, filtered, humidified to a relative humidity of 100%, heated to a temperature up to 100° C., e.g. 60 of 80° C., and fed to the TASTE-CHANGER™ conching machine via its inlet.

The mixture leaving the TASTE-CHANGER™ conching machine flows directly into thin film evaporator and via the top funnel to the inner wall of the evaporator, where the mixture is evenly distributed over the inner wall by means of the wipers.

In an embodiment, the inner wall of the evaporator is heated by water having a temperature in a range from 60° C. to 80° C. to a temperature. Further, air having a temperature of 20° C. and a relative humidity of 60% is withdrawn from the surroundings, filtered, heated to a temperature in a range from 60° C. to 125° C., preferably from 60° C. to 80° C., fed to the drum via the hollow shaft, and jetted through the nozzles towards the film of chocolate mass on the inner wall. Thus, volatile components, in particular acids, and moisture evaporate from the mass and leave the evaporator via its top outlet.

In an embodiment, the temperatures and flow rates of water and air fed to the evaporator are selected to control the temperature of the chocolate mass on the inner wall, to a temperature up to 65° C., e.g. 55° C., for milk chocolate or to a temperature up to 85° C., e.g. 85°, for dark chocolate. The drum is operated at a rotational speed typically in a range from 30 to 400 rpm, preferably in a range from 50 to 350 rpm, preferably in a range from 100 to 300 rpm, e.g. at 250 rpm. In an embodiment, the speed at the circumference is in a range from 1.5 to 4.5 m/s, preferably in a range from 2.5 to 3 m/s.

In a traditional configuration comprising a five roller refiner and a conch, residence times are usually in a range from 4 hours for milk chocolate to 48 hours for dark chocolates. In comparison, with a combination of a ball mill, a TASTE-CHANGER™ conching machine, and a thin film evaporator residence times are e.g. in a range from 1 to 2 hours, providing considerable savings in energy consumption and other operating costs. Further, creaminess and viscosity of the chocolate are similar to that in chocolates obtained with traditional configurations.

The invention is not restricted to the above-described embodiments, which can be varied in a number of ways within the scope of the claims. For instance the thin film evaporator can be used to sterilise e.g. cocoa liquor, in particular by (locally) raising the temperature in the mass, e.g. to 150° C.

The invention claimed is:

1. A system for conching an edible mass, comprising a shear device, in turn comprising a housing, a shaft rotatably mounted in the housing, means for subjecting the edible mass to high shear stresses, means for spreading the edible mass after it has been subjected to high shear stresses to provide a spread edible mass, and an inlet for supplying a gas to the spread edible mass, and a thin film evaporator to further treat the edible mass exiting the shear device.

2. The system according to claim 1, wherein the shear device and the thin film evaporator are integrated in the same device.

3. The system according to claim 1, wherein the shear device is positioned above the thin film evaporator.

4. The system according to claim 1, further comprising a humidifier upstream of the gas inlet of the shear device.

5. The system according to claim 1, wherein the means for subjecting the edible mass to high shear stresses comprises at least one rotor and at least one corresponding stator and wherein, in axial direction, the at least one stator extends above and/or beneath the rotor.

6. The system according to claim 1, wherein the thin film evaporator comprises a rotationally symmetrical inner wall for conveying a film of edible mass, means for heating the inner wall, and a plurality of nozzles for directing a gas towards the inner wall mounted within the confines of the inner wall.

7. The system according to claim 6, comprising a drum mounted rotatably within the confines of the inner wall and provided with openings forming the nozzles.

8. The system according to claim 1, wherein the thin film evaporator is oriented vertically.

9. The system according to claim 1, wherein the central driving shafts of the shear device and the thin film evaporator are co-axial.

10. The system according to claim 1, further comprising a ball mill upstream of the shear device.

11. A process for treating a flowable substance, comprising the steps of
subjecting the flowable substance to high shear stresses,
spreading the flowable substance to form a film and/or mist,
supplying a gas to the spread flowable substance, and
subsequently feeding the flowable substance to a thin film evaporator.

12. The process according to claim 11, wherein the gas is humidified before supplying it to the spread flowable substance.

13. The process according to claim 11, wherein the flowable substance flows substantially vertically through the thin film evaporator.

14. The process according to claim 11, wherein a gas is supplied to the thin film evaporator and the flowable substance and the gas flow in opposite directions.

15. The process according to claim 11, wherein, at least during said steps, the flowable substance is in a liquid state.

16. The system according to claim 1, wherein the edible mass is a cocoa-containing mass.

17. The system according to claim 16, wherein the cocoa-containing mass is selected from the group consisting of chocolate, cocoa liquor and a cocoa compound.

18. The system according to claim 1, wherein the means for spreading the chocolate mass consists of a rotary driven disc that provides a film of the edible mass, and the means for subjecting the edible mass to high shear stresses is formed by radially directed pins on a drive shaft of said rotary driven disc and rings directed radially relative to said drive shaft.

19. The system according to claim 3, wherein the shear device is positioned on top of the thin film evaporator.

20. The system according to claim 5, wherein the clearance between the rotor and the stator is less than 6 mm.

21. The system according to claim 5, wherein the clearance between the rotor and the stator is less than 4 mm.

22. The system according to claim 5, wherein the clearance between the rotor and the stator is less than 3 mm.

23. The system according to claim 6, wherein the nozzles are rotatably mounted.

24. The process according to claim 11, wherein the treating is conching and the flowable mass is an edible mass.

25. The process according to claim 11, wherein the gas supplied to the spread flowable mass is air.

26. The process according to claim 12, wherein the gas supplied to the spread flowable mass is humidified to at least 80% relative humidity at 20° C.

* * * * *